H. B. MATHEWSON.
SCALE FORMING APPARATUS.
APPLICATION FILED NOV. 26, 1915.
1,191,714.
Patented July 18, 1916.
3 SHEETS—SHEET 1.
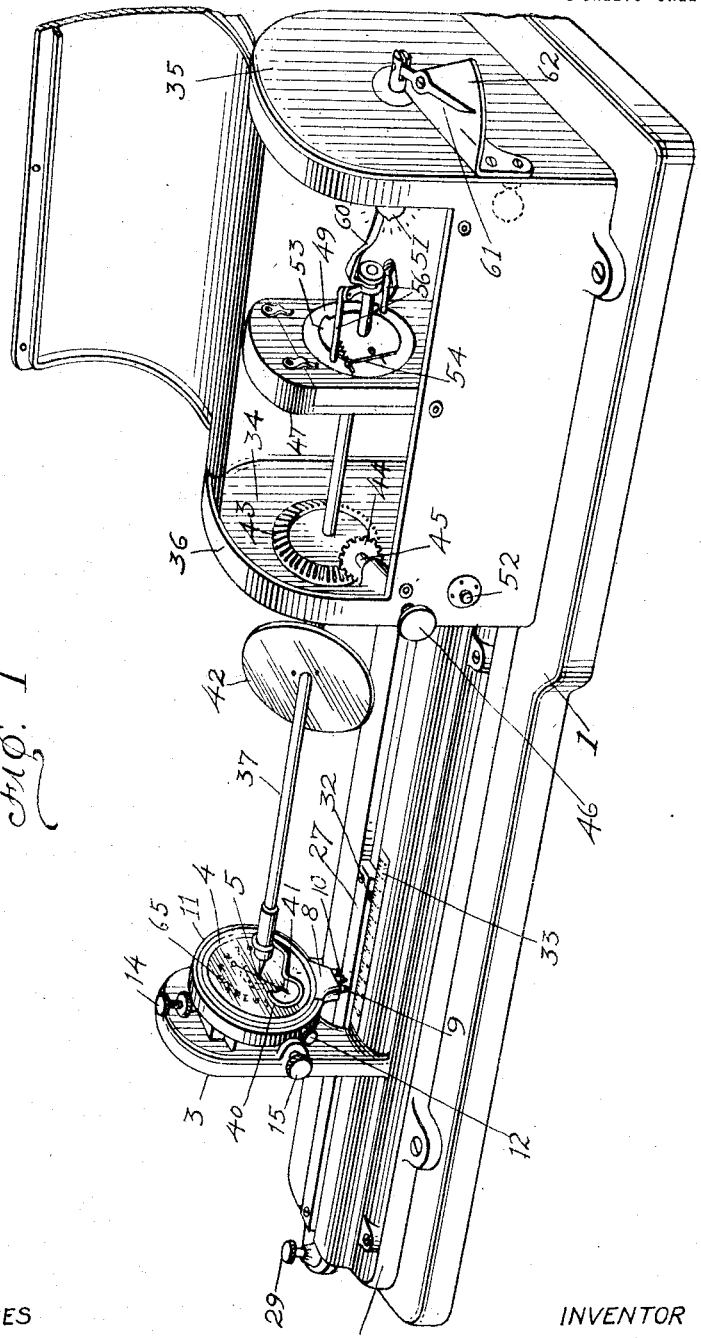
Fig. I
WITNESSES
Joseph J. Demers
Edith M. Halvorsen
INVENTOR
Henry B. Mathewson
BY
H. H. Styll  A. K. Parsons
ATTORNEYS H. B. MATHEWSON.
SCALE FORMING APPARATUS.
APPLICATION FILED NOV. 26, 1915.
1,191,714.
Patented July 18, 1916.
3 SHEETS—SHEET 2.
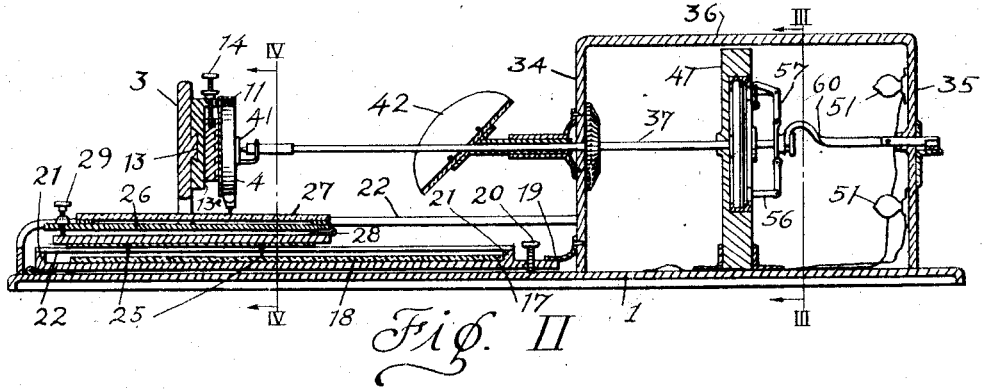
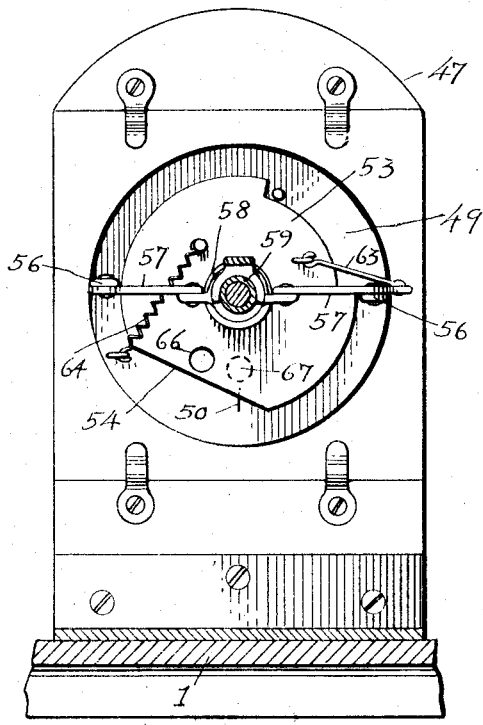
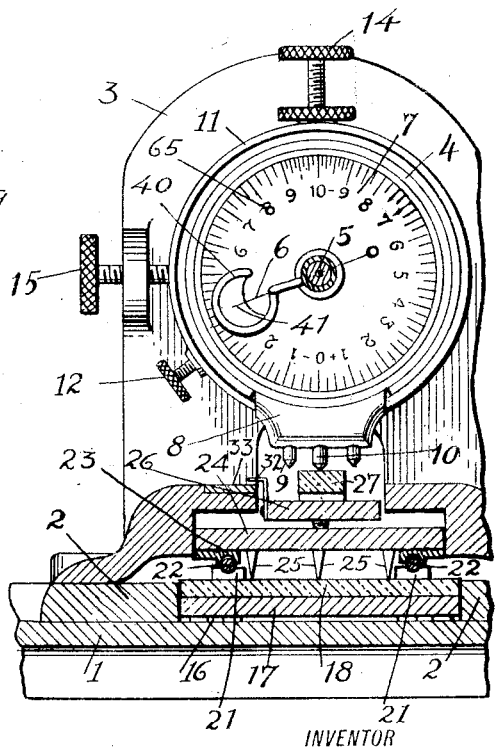
WITNESSES:
Joseph J. D. Emery
Edith M. Halvorsen
INVENTOR
Henry B. Mathewson
BY
H. H. Styll & H. H. Parsons
ATTORNEYS

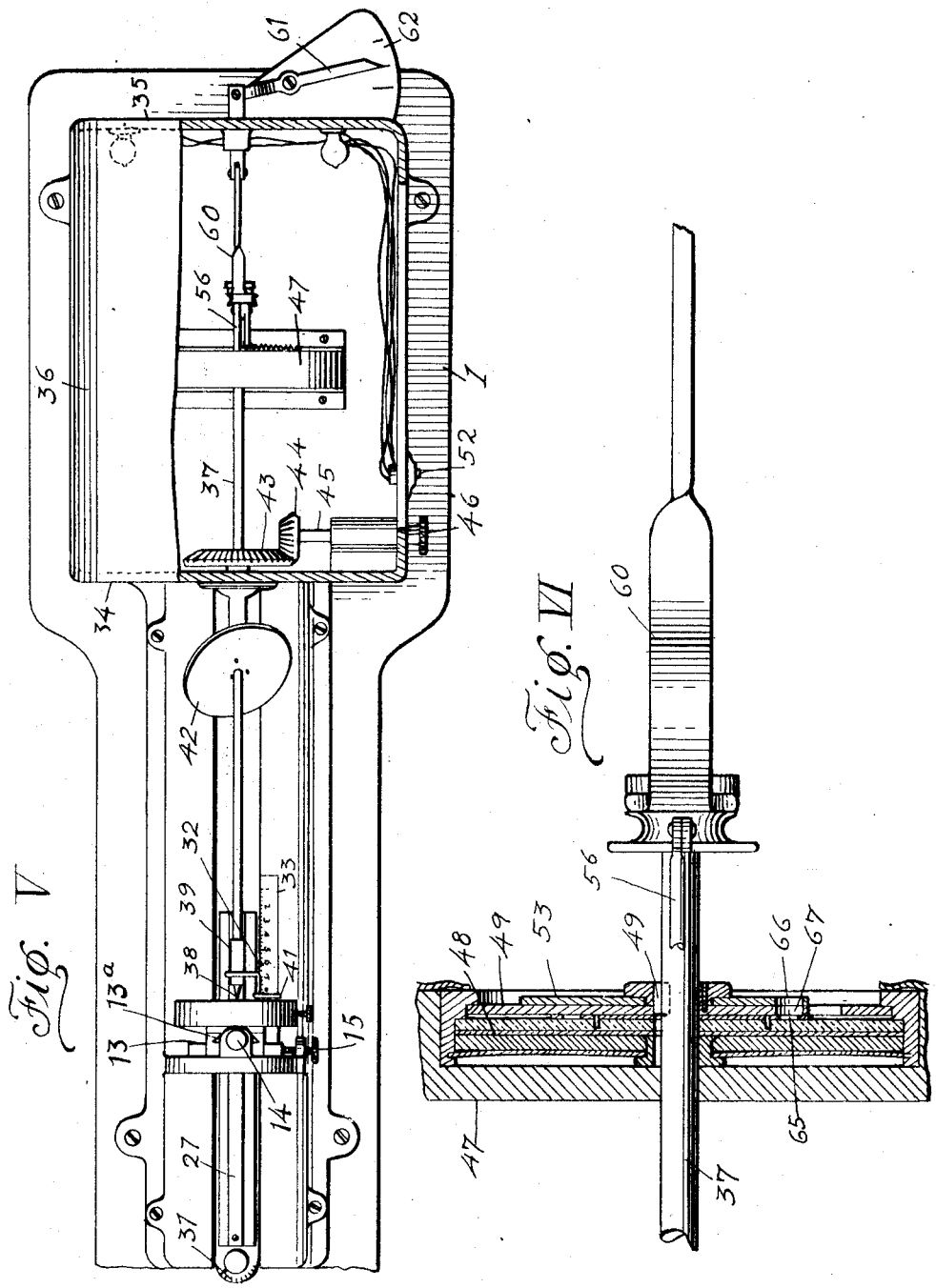

UNITED STATES PATENT OFFICE.

HENRY B. MATHEWSON, OF SAN FRANCISCO, CALIFORNIA, ASSIGNOR TO AMERICAN OPTICAL COMPANY, OF SOUTHBRIDGE, MASSACHUSETTS.

SCALE-FORMING APPARATUS.

1,191,714. Specification of Letters Patent. Patented July 18, 1916.

Application filed November 26, 1915. Serial No. 63,552.

*To all whom it may concern:*

Be it known that I, HENRY B. MATHEWSON, a citizen of the United States, residing at San Francisco, in the county of San Francisco and State of California, have invented certain new and useful Improvements in Scale-Forming Apparatus, of which the following is a specification.

This invention relates to improvements in scale forming apparatus, and has for its object the provision of an improved apparatus, by which a dial or scale may be readily formed, having indications in predetermined relation to positions occupied by a registering or indicating device on the apparatus for which the scale is intended.

A further object of the invention is the provision of an improved apparatus particularly adapted for use in connection with a measuring instrument having a circular scale and hand movable thereover, such as a lens measure for example, which apparatus will permit of the exact registering of the several positions of the hand or pointer on a separate index which may be later applied to the instrument.

Another object of the invention is the provision of improved apparatus for accurately attaining the various desired adjustments of a curve measuring appliance without the use of varying curves or the like and in connection therewith of means for photographically or similarly indicating in a permanent manner the exact amount of movement of the indicator for a certain known adjustment of the parts.

Other objects and advantages of my improved apparatus should be readily apparent by reference to the following specification taken in connection with the accompanying drawings forming a part thereof, and it will be understood that I may make any modifications in the various details of construction, combination and arrangement of parts hereinafter disclosed, within the scope of the appended claims without departing from or exceeding the spirit of my invention, it being understood that in the accompanying drawings I have illustrated merely one of many possible physical embodiments of the generic principles of my invention.

Figure I represents a perspective view of one form of my apparatus in operative position. Fig. II represents a longitudinal sectional view thereof. Fig. III represents an enlarged sectional view on the line III—III of Fig. II. Fig. IV represents a transverse sectional view on the line IV—IV of Fig. II, particularly illustrating the device to be corrected and the parts closely associated therewith. Fig. V represents a top plan view of the complete apparatus, a portion of the cover of the photographic chamber being removed. Fig. VI represents an enlarged sectional view centrally of the photographic apparatus.

In the drawings, in which similar characters of reference are employed to denote corresponding parts throughout the several views, the numeral 1 designates the table portion or base of the apparatus having secured thereon the longitudinally extending bracing and guide members 2, while rising from the table portion 1 is the superstructure of my apparatus, comprising a hood or inclosed chamber at one end thereof and a frame 3 near the opposite end. This frame 3 is intended to support the device whose dial is to be formed or corrected, and for convenience in the present instance I have shown this device as a lens measure or watch, as it is commonly termed in the art, the particular form illustrated comprising a cylindrical casing having the central arbor 5 bearing the hand or indicator 6 and adapted to be provided with a dial as 7. This watch has projecting from one side the guide 8 bearing the pair of stationary pins 9 and the movable central pin 10. This pin, as is well known by those versed in the art, is connected through suitable gearing or the like to rotate the arbor 5 and thus the hand 6 when brought into engagement with a lens. The pin 10 normally projects a considerable distance beyond the points of the pins 9 to fit concave surfaces, while it may be pressed inward, as when the device is brought against a convex surface, to correctly measure this surface. As this particular apparatus for example is designed to measure ophthalmic lenses for use in the correction of visual defects, it is essential that it be as accurate as possible in its measurement, and it is, therefore, the purpose of the embodiment of my invention here illustrated to facilitate the forming of a dial or scale 7 for an indicator of this nature which in place of being mathematically figured, as is ordinarily the case, will be determined by the actual positions assumed by the hand 6 at its different adjustments and will thus take care of any irregularities in the gearing or the like contained within the case 4, and will permit of the ready correction of the measure at any time by the forming of a new dial to be substituted for the old and incorrect one. In the accomplishment of this result I employ the holder 11 having a member 12 for clampingly securing the lens measure therein, said holder being supported by the slides 13 and 13ª, movable in directions at right angles to each other by means of the adjusting screws 14 and 15, respectively, so that the holder and measure contained therein may be positioned in my apparatus with extreme accuracy, the slide 13 being carried by the frame 3 in suitable guides formed on the frame, and the slide 13ª moving across the face of the slide 13, as should be readily understood by reference to Figs. I and IV.

Pivotally secured to the base or table 1, as at 16, is the bed plate 17, bearing the plate glass or other guide member or bed 18, said bed plate being at its free end pressed into engagement with the support 1 by the spring 19 and being adjustable as to its horizontal angle by means of the set screw 20, as will be best understood by reference to Fig. II. Rising from this bed plate are the brackets 21 carrying the guide rod or rods 22, adapted to be engaged by the grooved or channel members 23 on the under side of the slide or carriage 24, which has the points 25 resting on the bed 18. This carriage is similarly provided with a supplemental bed plate or member 26 bearing the straight-edge 27 of glass or other suitable material capable of being formed to approximate if need be a theoretical plane surface or straight line, the member 26 being pivotally supported as at 28 on the carriage 24 and being adjustable relative to the carriage at its free end by means of the vernier screw or like arrangement 29, which is preferably provided with a vernier scale coöperating with an indicator on the member 26 to indicate the angular adjustment of the straight edge 27 relative to the carriage, although it will be understood that in place of or in addition to this indicator a sector-like indicator 31 may be provided to indicate said adjustment.

As previously mentioned, the form of my invention here illustrated is particularly adapted for use in the correction or formation of correct dials for lens measures or the like, or in other words, for measures adapted for use in connection with varying curved surfaces. In accomplishing this result, therefore, the said plate 17 is so leveled by means of the screw or adjusting device 20 and the straight-edge so leveled by means of the adjusting device 29 that when the center point 10 of the measure is brought into engagement with the straight edge 27 and the carriage moved back and forth beneath said point, the said point will remain in exact registration with the zero mark or point on the measure.

It is well known that the lens curves corresponding to the various diopters and fractions of diopters have a constant variation, and I make use of this fact in my apparatus as follows: The bed and the straight-edge on the carriage having been so adjusted that there is no movement of the hand 6 as the carriage is slid back and forth beneath the measure, but the hand 6 remains at zero, I then shift the carriage a predetermined distance which may be determined from the pointer 32 and scale 33, and by means of the adjusting device 29 vary the angle of the straight-edge 27 relative to this carrige by any desired amount. The usual manner of determining this amount is by applying the measure before it is placed in the machine to a lens of a known standard value and making a mark to indicate the position occupied by the pointer 6 when the measure is applied to that lens. The straight-edge is then raised in engagement with the point 10 till the hand 6 is forced into this known position. This position is preferably a fixed diopter number, as for example, the position at which the measure would accurately indicate a power of 10 diopters in a lens being measured. A movement of one-tenth of this distance then from either the zero point or the ten point, will cause a movement of the pointer corresponding to a variation of one diopter, a movement of two-tenths, a variation of two diopters, and so on. These equal movements may be determined by the pointer 32 and scale 33, and the various subdivisions or quarters and eighth diopters may be similarly determined. It will thus be seen that movement of the carriage back and forth will cause a rotary movement of the arbor 5 and a swinging of the hand or pointer 6, while the position it occupies when measuring each diopter or fraction of a diopter in the power of a lens is mechanically determined by my apparatus in place of the scale being formed to theoretically or mathematically determine the position which the hand should occupy, if ideal conditions as to construction, lack of wear, etc., in the various parts of the measure existed.

While it will be understood that if desired the various positions occupied by the hand as the carriage is moved along to the various graduations on the scale could be indicated on the dial 7 by suitable marking directly thereon, I prefer to employ the mechanism hereinafter described, which may be used to form either a photographic or manually marked dial, as may be desired, but which in any event permits of more accurate marking and the production of a more neat and attractive dial than would be possible by a direct marking on the face of the instrument when mounted in my apparatus, and in addition eliminates the possibility of disarranging the adjustment of the measure as might occur were the attempt made to place the marks directly on the face of its dial.

As mentioned, I have mounted on the opposite end of the base 1 from that on which the frame 3 for the measure is located a hood comprising the end portions 34 and 35 and the inclosed casing 36, which is preferably constructed to be light-proof. Journaled in the member 34 is the horizontally extending spindle or shaft 37, which projects inwardly beyond the member 34 and terminates in the point 38, adapted to be centered with the arbor 5, this point being carried by the sleeve 39 slidable on the shaft 37 to permit of bringing of the pointer into engagement with the exposed end of the arbor if desired. This sleeve is further provided with the sighting guide 40 having a suitable notch, hair, cross line or the like 41 adapted to aline with and form a continuation of the hand 6, as clearly illustrated in Fig. IV. A rotary adjustable angularly disposed mirror 42 surrounding the shaft 37 and supported by the end 34 of the hood facilitates exact sighting or alining the indicator 41 and hand 6 at any position of the hand. To rotate the shaft 37 to aline the indicator 41 and hand, the shaft is suitably provided as interiorly of the hood 36 with the gear 43 having meshing therewith the pinion 44 on a spindle 45 provided with the knurled head or handle 46 projecting exteriorly of the hood 36, whereby rotation of the head 46 imparts a slow rotary movement to the shaft 37, as will be clearly understood by reference to Fig. I, the hood being raised to facilitate the illustration and understanding of these parts.

I have hereinafter described the preferred form taken by my apparatus when it is desired to photographically form the dial, it being understood that when it is desired to manually or otherwise form the same it is merely necessary to have the shutter or indication guide, as it may be termed, so disposed that a marking device may be operated through the slot in the shutter in place of a ray of light being used to imprint the mark on a sensitized film or paper, the general operation being otherwise the same.

In the form here illustrated I have shown as suitably supported within the hood 36 the frame 47 for supporting the sensitized film or paper 48 and the shutter device, the shutter device having a key-way adapted to slide over the spline 49 on the shaft 37 so that the shutter will be locked to rotate with this shaft. The sensitized paper 48 having been placed in position in the frame 47 and the shutter mounted on the frame, the complete device is inserted within the hood 36 and placed in position, the shutter fitting on the spline 49 to rotate therewith, and the slot 50 in the shutter being disposed in alinement with the indicator 41 located on the opposite end of the shaft.

Carried by the end 35 of the hood is a suitable bulb or source of illumination 51 controlled as by the push button 52. The parts being in this position and in the relation indicated in Fig. I for example, it is merely necessary to press on the button 52 when the interior of the hood will be temporarily illuminated and a photographic impression of the slot 50 will be made on the paper 48. The carriage is then moved to the next desired position according to the scale 33 and pointer 32, the knob or handle 46 turned to bring the indicator 41 into alinement with the hand 6 in its new position and a second photograph taken, and so on until the complete scale has been photographically formed.

It will be noted that in the form of dial illustrated on the lens measure, the several graduations are of unequal length, that is to say, the diopter graduations are longest, the half-diopter graduations are of an intermediate length, while the quarter-diopter variations are still shorter. This may be accomplished in one of two manners, as may be preferred by the individual operator. The shutter 49, as mentioned, is provided with the slot 50, while rotatably mounted on the face of the shutter is the supplemental shutter 53 having an angularly cut-away portion at one side to provide the inclined edge 54 adjacent the slot 50. In the form illustrated I have indicated an improved manner of rotatably shifting the auxiliary shutter 53 so that any desired length of slot may be secured, or the auxiliary shutter may be shifted to entirely cover the slot 50 and thus entirely protect the sensitive plate or film 48. In this construction the main shutter 49 has projecting therefrom the posts 56, to which are pivoted the arms 57 having their other ends connected to the shift collar 58 which is engaged by the yoke 59 on the control rod 60, which projects through the end 35 of the hood, and has connected to its outer end the shift lever 61, riding on the segment 62, which is suitably marked to indicate the various adjustments of the lever 61.

One of the levers 57 is in the form of a bell crank and has its end connected by means of the link 63 to the auxiliary shutter 53, in such manner that movement of the lever 61 will through the several connections draw the auxiliary shutter into open position and there hold the same against the tension of the spring 64 which normally tends to shift the auxiliary shutter into position to close the slot 50.

It will be readily understood by reference to the drawings that when the auxiliary shutter is in its widest open position a long line may be imprinted through the slot 50 on the sensitized paper 48, while similarly movement of the auxiliary shutter toward closed position will cause shorter lines to appear.

In the use of this device in connection with my apparatus, I preferably first set the same for the greatest length of slot and form the various measure marks on the proposed dial, I then set it for the intermediate length of mark on the dial and form all of the intermediate marks, after which I set it for the shorter ones and form all of these. It will be understood, however, that if preferred I may vary the adjustment after each mark and thus consecutively form the several marks around the dial in place of forming those of one size successively and then taking up another size, but the previously described method has been found to be under general conditions the more rapid.

It will be understood that while I have described this particular method of shifting the auxiliary shutter, and specific type of auxiliary shutter that I do not wish to be limited to the specific details of construction shown and described, since the auxiliary shutter could be rotated by hand if desired, particularly if the apparatus were being used in a dark room, or a slide or other device might be employed for varying the length of the slot 50 in place of the auxiliary shutter. The form here described, however, I have considered particularly advantageous inasmuch as the auxiliary shutter normally closes the slot 50 so that the sensitized paper 48 may be placed in the retaining frame 47 in a dark room and the shutter applied to the frame, and the complete device then taken into an ordinary lighted room, placed in position within the hood and the hood closed, after which the auxiliary shutter 53 may be shifted by the lever 61 to open the slot 50 the various desired amounts, and the complete dial formed, the lever 61 being again shifted to close the slot when the frame or holder 47 and parts may be removed to the dark room and the dial developed in the ordinary manner.

It will be understood that in the correction of dials for lens measures for example, the variation will ordinarily cause but a very slight difference in the position of the main measuring points on the dial, as for instance the various diopter figures or numerals 65, and I may, therefore, if desired mathematically determine the approximate position at which the numerals 65 should be located, and may form a printing mask or stencil bearing these numerals and clamp the same in proper position within the frame 47. In this event the shutters 53 and 49 will have the apertures 66 and 67 respectively, formed therein, the aperture 67 being a bulb at the inner end of the slot 50, while the aperture 66 is disposed in position to aline with the aperture 67 when the shutters are set to mark the longer or diopter indicating line on the dial. It will thus be seen that when the shutter 53 is set for the longer line, the apertures in the shutters will be alined and consequently if one of the numerals 65 is in approximate alinement with these apertures both the numeral 65 and the long or main division line will be simultaneously printed on the paper 48 upon energizing of the light 51. On the other hand, should there be a pronounced variation between the theoretical position of the figure on the dial and the point at which this figure should actually be located, the numeral will not be beneath the apertures in the shutter and consequently will not appear on the photographed dial but must be manually marked or printed on it.

In brief, the operation of my improved apparatus is as follows: A lens measure or other device for which a dial or scale is to be made, is tested by application to a plano and to a surface of known curvature, to determine the position occupied by the hand 6 at zero or plano and at the point of known curvature, and these points are marked on the face. The instrument is then placed within the adjustable holder carried by the frame or standard 3, and the bed plate, straight edge and holder relatively adjusted till the center point 10 rests on the straight edge 27, the points 9 span and are out of engagement with the straight edge, and the hand 6 registers with the zero mark, when the pointer 32 on the carriage coincides with the zero mark on the scale 33. The carriage is then moved till the pointer 32 corresponds in its position on the scale 33 with the predetermined point marked on the face of the measure and the straight edge angularly adjusted till the hand or indicator 6 also coincides with this mark. Equal graduations along the scale as the carriage is moved back and forth then cause corresponding amounts of movement of the point 6. The sensitized paper, etc., is then placed in the frame or holder 47 within the light-proof hood 36, the auxiliary shutter shifted to open the slot 50 and the shaft 37 rotated to bring the indicator 41 in line with the hand 6. Pressure on the button 52 then energizes the light 51 to print an indicating line or line and number, as the case may be, on the sensitized paper 48, when the carriage is slid to a new position and the operation repeated until the complete scale has been printed. The shutter is then closed or all lights in the room extinguished, and the sensitized paper and holder removed and the paper developed in the ordinary manner. It may then be applied to the face of the measure and forms an absolutely accurate and correct dial therefor.

From the foregoing description taken in connection with the accompanying drawings, the construction and operation of my improved apparatus should be readily apparent, and it will be seen that I have provided a simple, efficient and practical apparatus which will produce an absolutely accurate dial indicating the actual movement of a pointer irrespective of the mechanical inaccuracies or irregularities of the indicator for equal movements of the contacting point.

I claim:

1. In an apparatus of the character described, the combination with a holder for the measure to be corrected, of means adjacent the holder for engaging the measure and actuating the mechanism thereof a certain predetermined amount, and means coöperating with the indicator on the measure for recording the response of the indicator to the known actuation of the mechanism of the measure.

2. In a device of the character described, the combination with a base, of a holder supported thereby and adapted to receive a measure, means on the base adjacent the holder for actuating the mechanism of the measure a known amount, a shiftable sighting device carried by the base and mounted for movement corresponding with the movement of the indicating portion of the measure, means for manually alining the sighting device and indicator on the measure, and means for recording the movement of the sighting device.

3. In an apparatus for testing a measure of the type having a movable contact point and a rotatable indicator, the combination with a holder for the measure, of means adjacent the holder for shifting the contact point known amounts, an alining arm mounted for movement corresponding to the movement of the indicator, means for moving the arm to coincide with the movement of the indicator, a slotted shutter movable with the arm, and means for causing the adjustment of the arm and shutter to be photographically recorded as desired.

4. In an apparatus of the character described, the combination with a holder adapted to receive a measure with a movable point and an indicator, of an inclined straight edge mounted for movement across the point of the indicator whereby different adjustments of the straight edge will cause known movements of the point of the indicator, recording mechanism, and means for shifting the recording mechanism to aline with the indicator at each movement of the indicator caused by the shifting of the straight edge to record the several positions of the indicator for known movements of the contact point of the measure.

5. In an apparatus of the character described, the combination with a support, of a holder on the support adapted to secure the instrument to be tested, a shiftable contact device on the support adjacent the holder adapted to engage and actuate the instrument to be tested, a second support on the base, a shaft journaled in said second support and bearing a sighting device for coöperation with the indicator of the instrument, a guide device in the shape to facilitate recording of the position of the shaft and sighting device and means for rotating the shaft to aline the sighting device with the indicator of the measure.

6. In an apparatus of the character described, the combination with a support, of a slide bed mounted thereon, a carriage movable over the bed, a straight-edge on the carriage, and means for holding an instrument to be tested in desired relation to the straight-edge.

7. In an apparatus of the character described, the combination with a support and a carriage movable on the support, of a straight-edge on the carriage, means for angularly adjusting the straight-edge, and means for supporting an instrument to be tested with the desired portion thereof in contact with the straight-edge.

8. In an apparatus of the character described, the combination with a support and a carriage movable thereover, of a contact carried by the carriage and adjustable relative thereto, a standard adjacent the carriage, and an instrument holding device mounted on the standard for movement toward and movement transversely of the contact on the carriage.

9. In an apparatus of the character described, the combination with an instrument holding device and means for actuating the instrument, of means for recording the response of the indicator on the instrument to known actuations, including means for holding a dial sheet, an alining device adapted to be alined with the indicator of the instrument, and a member movable synchronously with the alining device and having a marking slot traveling over the dial sheet to facilitate recording on said sheet various adjustments of the instrument.

10. In an apparatus of the character described, the combination with a base and a standard rising therefrom, a primary bed plate mounted on the base beneath the standard, means for tiltingly adjusting said bed, a carriage movable over the bed and bearing a straight edge, means for tilting the straight edge on the carriage to counterbalance or accentuate the tilting of the primary bed as desired, means on the standard for holding an instrument to be tested in such position that a portion thereof will engage the straight edge, and means for recording the effect on the instrument of its engagement with the straight edge.

11. In an apparatus for correcting measures, the combination with a holder for the measure to be corrected, of a slidable carriage having a straight-edge for engaging a movable portion of the measure, means for adjusting the straight-edge on the carriage, a rotatable indicator on the measure, a shaft alined with the axis of the indicator and having a finger curved to aline with the indicator on the measure, a dial sheet holder arranged concentric with the shaft, and a slotted member adjacent the dial sheet holder and rotating with the shaft, whereby as the shaft is turned to bring the finger into alinement with the indicator on the measure in various positions these positions may be marked on the dial sheet through the slot, substantially as illustrated.

12. In dial forming mechanism, the combination with a rotatable shaft, of a radially apertured shutter carried by the shaft, a supplemental shutter adapted to partially close the aperture in the first shutter to vary its radial length, and means for relatively moving the shutters to control the size of the effective aperture in the main shutter.

13. A lens measure correcting apparatus, embodying means for holding a lens measure having a movable point, an inclined straight-edge slidably engaging the movable point of the lens measure, a scale and pointer for indicating the amount of sliding movement of the straight-edge, and means for recording the position of the indicator on the measure as the pointer is moved into alinement with each of the several graduations on the scale.

14. In a device of the character described, the combination with a holder, of a straight-edge, means for angularly adjusting the straight-edge relative to the holder, a scale and pointer for indicating the amount of longitudinal movement of the straight-edge, and means for photographically registering the effect on the instrument in the holder of these various movements of the straight-edge.

15. A dial forming apparatus for lens measures, including a support for the measure, and a support for a dial sheet, means for engaging the measure to produce the effect of the application thereto of lenses of different dioptrics, a shaft axial with the pointer on the measure, and means carried by the shaft near each end and traveling therewith, one of said means moving over the face of the measure and the other over the face of the proposed dial, whereby when the said means near the dial is alined with the pointer on the measure the position of the pointer may be accurately indicated on the dial sheet through the medium of the other of said means as a guide.

16. In an apparatus of the character described, the combination with a lens measure holder, and an indicator sheet holder, of a shutter movable over the holder, a finger movable over the face of the lens measure holder and measure contained therein, means for moving the finger and shutter in unison, the said shutter having an aperture therein, means for varying the size of the aperture in the shutter, and manually controlled means for illuminating the shutter as desired, whereby photographic images of the various positions of the aperture in the shutter may be formed when a sensitized indicator sheet is employed.

17. The combination with a base and a support rising therefrom, of an instrument holder on the support adapted to receive an instrument having a shiftable contact point and a rotatable indicator for indicating the movement of the point, a straight edge on the base for engaging the point, said straight edge being mounted for vertical and sliding movements whereby shifting of the straight edge known amounts will cause known movements of the contact point of the instrument, means for determining the amount of movement of the straight edge, a photographic apparatus including a rotatable shutter, means for rotating the shutter to correspond with different movements of the indicator on the instrument, and means for actuating the photographic apparatus to record the several rotative adjustments of the shutter as desired.

In testimony whereof I affix my signature in the presence of two witnesses.

HENRY B. MATHEWSON.

Witnesses:
ALBERT C. SMALLEY,
FRED. W. WARD.